United States Patent
Heimann

(10) Patent No.: US 6,990,842 B2
(45) Date of Patent: Jan. 31, 2006

(54) METHOD FOR DEEP-ROLLING TRANSITIONS BETWEEN THE BEARING JOURNALS AND THE FLANGES OF CRANKSHAFTS

(75) Inventor: Alfred Heimann, Aachen (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 31 days.

(21) Appl. No.: 10/765,329

(22) Filed: Jan. 26, 2004

(65) Prior Publication Data

US 2004/0255631 A1    Dec. 23, 2004

(30) Foreign Application Priority Data

Feb. 26, 2003   (DE) ............................... 103 08 124

(51) Int. Cl.
*B21D 15/00* (2006.01)

(52) U.S. Cl. ........................ 72/110; 29/90.01; 29/6.01

(58) Field of Classification Search .................. 72/84, 72/107, 110, 111, 121, 75, 76, 366.2; 29/90.01, 29/6.01
See application file for complete search history.

(56) References Cited

U.S. PATENT DOCUMENTS

| | | | |
|---|---|---|---|
| 4,860,566 A * | 8/1989 | Augustin | 72/110 |
| 5,333,480 A * | 8/1994 | Berstein | 72/110 |
| 5,666,841 A | 9/1997 | Seeger et al. | |
| 6,393,885 B1 | 5/2002 | Cadena | |
| 6,622,570 B1 * | 9/2003 | Prevey, III | 73/826 |

FOREIGN PATENT DOCUMENTS

DE           43 09 176        9/1994

* cited by examiner

*Primary Examiner*—Ed Tolan
(74) *Attorney, Agent, or Firm*—Proskauer Rose LLP

(57) ABSTRACT

The invention pertains to a method for deep-rolling radii or fillets (2) at the transition between the bearing journals (3) and the adjacent flange (4) of a bearing point of a crankshaft (1) with the aid of deep-rolling cylinders. The deep-rolling cylinders are pressed into the radius or the fillet (2) of the transition with a deep-rolling force until a predetermined roll-down depth (10) is reached while the crankshaft (1) is turned. The transition is initially deep-rolled with a first deep-rolling cylinder, the radius (6) of which has an osculating ratio between 1 and 0.85 referred to the radius of the transition or the fillet (2), namely with a first deep-rolling force that produces a maximum internal compressive stress (7) in the transition at a depth between 1 and 2 mm below the deep-rolled surface (8). The same transition is subsequently rerolled with a second deep-rolling cylinder that has a smaller radius (14) than the first deep-rolling cylinder (5), the magnitude of which is chosen such that the second deep-rolling cylinder causes a further plastic deformation (11) on the deep-rolled surface (8) of the transition in addition to the plastic deformation achieved with the first deep-rolling cylinder.

1 Claim, 1 Drawing Sheet

Figure 1:
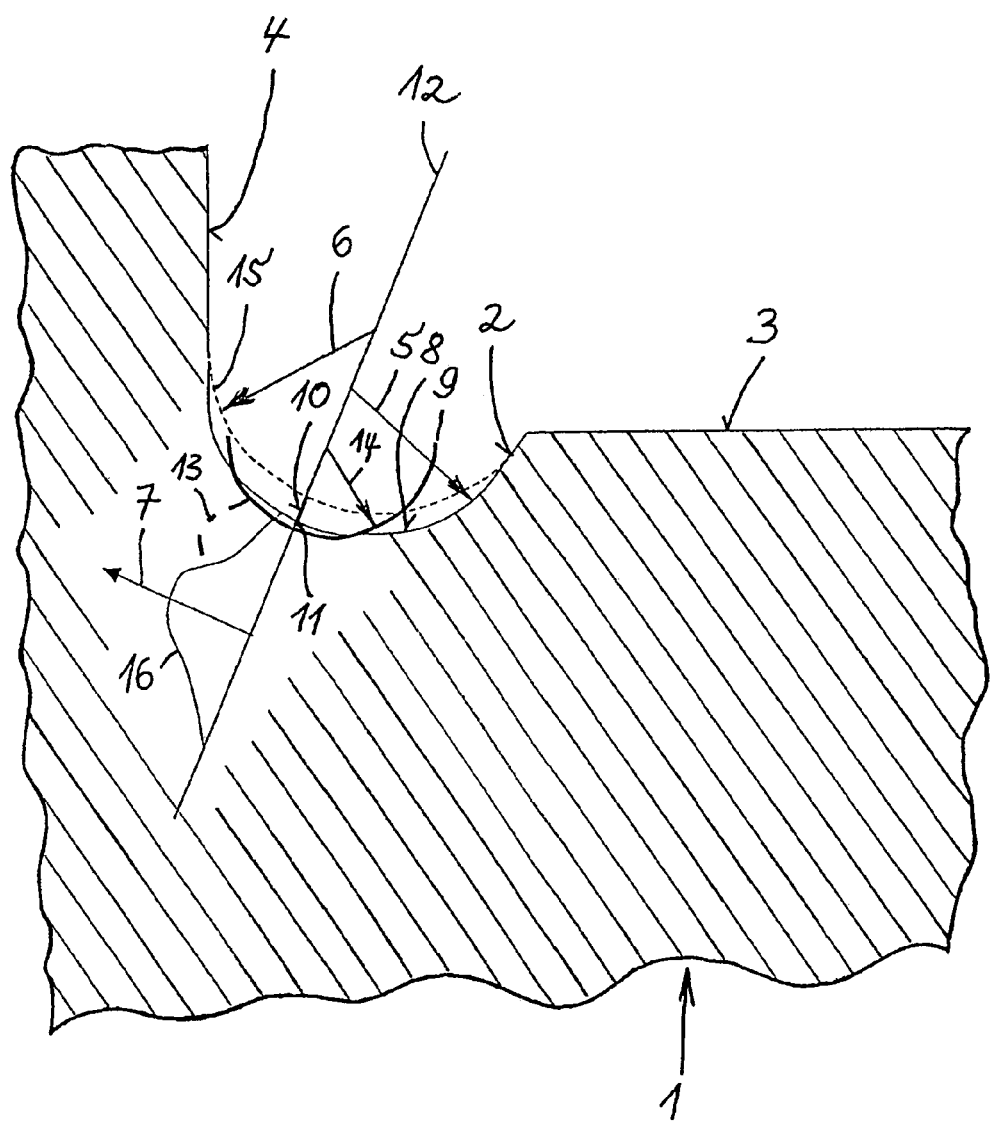

METHOD FOR DEEP-ROLLING TRANSITIONS BETWEEN THE BEARING JOURNALS AND THE FLANGES OF CRANKSHAFTS

The invention pertains to a method for deep-rolling radii or fillets at the transitions between the bearing journals and the adjacent flange of a bearing point of a crankshaft with the aid of deep-rolling cylinders that are pressed into the radius or the fillet of the transitions with a deep-rolling force while the crankshaft is rotated until a predetermined roll-down depth is reached.

Deep-rolling tools for deep-rolling fillets on the bearing journals of crankshafts are known, for example, from U.S. Pat. No. 6,393,885 B1. Internal compressive stresses are produced in the metal of the fillets of the crankshaft with the aid of known deep-rolling methods, wherein these compressive stresses may extend, for example, to a depth of 4 mm. The actual value of the rounding radii of deep-rolling cylinders should, as is known, be determined in such a way that they lie within the manufacturing tolerances for the fillets on the crankshaft. Adequate results are achieved if the rounding radius of the deep-rolling cylinder approximately conforms to the radius of the fillet. The deep-rolling force exerted by the deep-rolling cylinders can be increased or decreased while the crankshaft is rotated in order to produce patterns of concentrated internal compressive stresses in the metal of the fillets that represent the regions of a crankshaft which are subjected to the highest loads. The intensity of the deep-rolling force as well as the number of fillet rolling passes can, as is known, be predetermined in order to achieve an optimal fatigue strength. It is also advantageous to increase the actual width of the bearing journals of crankshafts.

DE 197 40 290 A1 discloses a method for deep-rolling, in particular, crankshafts. According to this method, it is not only possible to reduce the rolling forces and consequently the cylinder wear significantly, but also an optimization of the internal stresses with respect to their spatial distribution on the crankshaft and their intensity can be achieved. This method also allows the deep-rolling of high-strength materials. This known method thus makes it possible to increase the material stresses during the deep-rolling, for example, on the transition or undercut radii that are subjected to particularly high loads during operation, namely in such a way that higher internal stresses can still be achieved with reduced rolling pressures. This makes it possible, in turn, to increase the transition or undercut radii so as to reduce the notch effects occurring at these locations.

It is also known from DE 100 60 219 A1 to determine the quality of a deep-rolled crankshaft with the aid of several calipers that are respectively assigned to one of the crankshaft main bearings. Depending on the result of the measurement, in addition to a first deep-rolling operation a further deep-rolling operation may be carried out in order to reroll the radii or fillets of individual bearing points purposefully. The entire circumference of the bearing point in question or only a part thereof may be subjected to the rerolling process. The radii or fillets on individual main bearings or on the journals of the crankshaft may be included in the rerolling process.

In comparison with the state of the art, it was determined that the deep-rolling of such transitions produces internal compressive stresses in the radii or fillets of the crankshafts, wherein the maximum of these internal compressive stresses lies at a depth between 0.6 and 1.2 mm below the deep-rolled surface. The highest stress occurs in the transition due to the operating strain of the crankshaft in the form of rotating bending. The bending stresses of the operation are superimposed with the internal compressive stresses resulting from the deep-rolling and the yielding point is exceeded. The internal compressive stresses then weaken.

Incipient cracks can be observed on the surface of the deep-rolled transition, wherein these cracks extend up to the depth at which the highest internal compressive stresses below the surface were produced.

The invention is thus based on the objective of improving the fatigue strength of crankshafts by means of deep-rolling in such a way that the operation of the crankshaft no longer causes any incipient cracks to occur on the deep-rolled surface of the transitions.

According to the invention, this objective is attained by deep-rolling the transition between the bearing journals and the adjacent flange of a bearing point of a crankshaft, wherein the transition is initially deep-rolled with a first deep-rolling cylinder, the radius of which has an osculating ratio between 1 and 0.85 referred to the radius of the transition or the fillet, namely with a first deep-rolling force that produces a maximum internal compressive stress in the transition at a depth between 1 and 2 mm below the deep-rolled surface, and the same transition is subsequently rerolled with a second deep-rolling cylinder that has a smaller radius than the first deep-rolling cylinder, namely with a second deep-rolling force of such magnitude that the second deep-rolling cylinder causes a further plastic deformation on the deep-rolled surface of the transition in addition to the plastic deformation achieved with the first deep-rolling cylinder.

The second rolling process shifts the maximum of the internal compressive stresses produced during the initial rolling process closer to the surface. This results in a new pattern of internal compressive stresses which lies closer to the deep-rolled surface and consequently prevents the formation of incipient cracks.

The rerolling of the surfaces may be realized, for example, with a second deep-rolling tool in a second deep-rolling operation. However, it would also be conceivable to construct deep-rolling tools in such a way that several deep-rolling cylinders with different rounding radii are combined and successively engaged.

It is advantageous if the roll-down depth achieved with the first deep-rolling cylinder is approximately 0.2 mm and the additional roll-down depth achieved with the second deep-rolling cylinder is approximately 0.05 mm; this means that the total roll-down depth amounts to 0.25 mm.

One embodiment of the invention is described in greater detail below.

The figure shows an enlarged detail of the transition at the bearing point of a crankshaft.

The crankshaft 1 has a bearing journal 3 and a flange 4 that transform into one another via a fillet 2. The fillet 2 has a radius 6. The fillet 2 has the contour indicated with the broken line 15 prior to the deep-rolling process.

The surface indicated with the line 8 is obtained after the deep-rolling process with a (not-shown) first deep-rolling cylinder that has the radius 5. For example, the normal 12 referred to the surface 8 reaches a first roll-down depth 10. The roll-down depth 10 corresponds to an internal compressive stress 16 within the material of the crankshaft 1 which has its maximum 7 far below the deep-rolled surface 8 as shown in the figure.

According to the invention, the deep-rolled surface 8 is rerolled with a (not-shown) second deep-rolling cylinder that has a radius 14. This causes an additional plastic deformation in the fillet 2 which is indicated with the line 9. An additional roll-down depth 11 is reached underneath the initial roll-down depth 10 in the direction of the normal 12. The first roll-down depth 10 is approximately 0.2 mm, and the additional roll-down depth 11 is approximately 0.05 mm. This simultaneously causes a near-surface internal compressive stress 13 to be induced in the transition 2 of the crankshaft material, wherein this internal compressive stress prevents incipient cracks from forming on the surface 9 in the direction of the normal 12 during the operation of the crankshaft 12. The fatigue strength of the crankshaft 1 can be effectively increased in this fashion.

LIST OF REFERENCE SYMBOLS

1 Crankshaft
2 Fillet
3 Bearing journal
4 Flange
5 Roll-down depth
6 Radius of the fillet
7 Maximum of the internal compressive stress
8 Deep-rolled surface
9 Additional plastic deformation
10 First roll-down depth
11 Second roll-down depth
12 Normal
13 Near surface internal compressive stress
14 Smaller radius
15 Contour
16 Internal compressive stress

What is claimed is:

1. A method for deep-rolling radii or fillets at a transition between bearing journals and an adjacent flange of a bearing point of a crankshaft with the aid of deep-rolling cylinders that are pressed into the radius or the fillet of the transition with a deep-rolling force while the crankshaft is rotated until a predetermined roll-down depth is reached, comprising initially deep-rolling the transition with a first deep-rolling cylinder, the radius of which has an osculating ratio between 1 and 0.85 referred to the radius of the transition or the fillet, where the roll-down depth to be achieved with the first deep-rolling cylinder is approximately 0.2 mm below the surface of the radius of the transition or the fillet, and subsequently rerolling the same transition with a second deep-rolling cylinder that has a smaller radius than the first deep-rolling cylinder, the roll-down depth to be additionally achieved with the second deep-rolling cylinder being approximately 0.05 mm below the deep-rolled surface of the transition in addition to the plastic deformation achieved with the first deep-rolling cylinder.

\* \* \* \* \*